United States Patent
Vesta

(10) Patent No.: US 8,107,611 B2
(45) Date of Patent: Jan. 31, 2012

(54) METHODS, SYSTEMS, AND COMPUTER READABLE MEDIA FOR AUTOMATICALLY DISPLAYING CUSTOMIZED CALL CENTER OPERATING STATISTICS BASED ON USER PROFILE INFORMATION

(75) Inventor: Benjamin W. Vesta, Oswego, IL (US)

(73) Assignee: Aceyus, Inc., Weddington, NC (US)

( * ) Notice: Subject to any disclaimer, the term of this patent is extended or adjusted under 35 U.S.C. 154(b) by 958 days.

(21) Appl. No.: 12/062,643

(22) Filed: Apr. 4, 2008

(65) Prior Publication Data

US 2009/0252319 A1 Oct. 8, 2009

(51) Int. Cl.
*H04M 3/523* (2006.01)
(52) U.S. Cl. .......... 379/265.03; 379/265.09; 379/266.06
(58) Field of Classification Search .............. 379/265.01, 379/265.02, 265.03–265.14, 266.01–266.1
See application file for complete search history.

(56) References Cited

U.S. PATENT DOCUMENTS

| | | | |
|---|---|---|---|
| 6,115,040 A | 9/2000 | Bladow et al. | |
| 6,392,666 B1 | 5/2002 | Hong et al. | |
| 6,490,350 B2 | 12/2002 | McDuff et al. | |
| 6,707,904 B1 | 3/2004 | Judkins et al. | |
| 6,711,253 B1 | 3/2004 | Prabhaker | |
| 6,829,348 B1 * | 12/2004 | Schroeder et al. | 379/265.09 |
| 7,046,789 B1 * | 5/2006 | Anderson et al. | 379/265.01 |
| 7,266,192 B2 | 9/2007 | Statham et al. | |
| 2003/0169870 A1 * | 9/2003 | Stanford | 379/265.12 |
| 2006/0147026 A1 | 7/2006 | Statham et al. | |
| 2008/0037761 A1 * | 2/2008 | Cordell et al. | 379/265.04 |

OTHER PUBLICATIONS

Cisco Systems, "Cisco ICM Release 6.0(0) Staging on Windows 2000," (May 2004).

* cited by examiner

*Primary Examiner* — Harry Hong
(74) *Attorney, Agent, or Firm* — Jenkins, Wilson, Taylor & Hunt, P.A.

(57) ABSTRACT

The subject matter described herein includes methods, systems, and computer readable media for automatically displaying customized call center operating statistics based on user profile information. According to one aspect, a method for automatically displaying customized call center operating statistics based on user profile information is provided. The method includes receiving user profile information associated with a user, wherein the user profile information uniquely identifies the user seeking access to customized call center operating statistics. Customized call center operating statistics to be displayed are automatically determined based on the user profile information. The customized call center operating statistics are then displayed to the user.

24 Claims, 7 Drawing Sheets

METHODS, SYSTEMS, AND COMPUTER READABLE MEDIA FOR AUTOMATICALLY DISPLAYING CUSTOMIZED CALL CENTER OPERATING STATISTICS BASED ON USER PROFILE INFORMATION

TECHNICAL FIELD

The subject matter described herein relates to displaying call center operating statistics. More particularly, the subject matter described herein includes methods, systems, and computer readable media for automatically displaying customized call center operating statistics based on user profile information.

BACKGROUND

Call centers have become essential to the operation of businesses that provide products or services. For example, call centers are used primarily to provide customer support for products or services. One function of a call center is to direct a customer to the most appropriate employee to meet the customer's need. When used effectively, a call center can reduce the number of employees required to provide customer service without a corresponding decrease in customer satisfaction.

In order for a call center to serve its purpose of eliminating the number of employees required to provide customer service without decreasing customer satisfaction, it is desirable to monitor call center operating parameters or statistics. For example, it may be desirable to monitor the average time in which a call is answered, the handling time of a call, and the number of agents on staff to handle calls at any given time. In order to provide a view of such statistics, call center software vendors and telecommunications equipment manufacturers have provided databases for storing call center data upon which operating statistics can be based. For example, the Intelligent Contact Management (ICM) database available from Cisco Systems of San Jose, Calif. provides call center operating statistics. Other databases provided by other vendors store call center data upon which statistics can be based. Data from these databases is often displayed to a user. For example, software has been developed that queries the databases and displays the data to a user.

Call center data is often displayed in a report for easier reading. Rather than simply displaying the call center data raw and unformatted, the data may be formatted into groupings and displayed, for example, in a webpage. Within the call center industry, these reports may also be referred to as dashboards, where dashboards may include one or more objects for displaying call center data. Objects are groupings of call center data which share a common format or other criteria associated by the user. For example, call center data objects may be grids, bar charts, pie charts, colors, and images.

Call center operating statistics reports may also be customized and saved for future use. Conventionally, a user may log in to a dashboard system for viewing call center statistics and see a report capable of displaying all types of call center statistics. However, because only a subset of the total number of statistics available may be of interest to a given user, the user may customize the report and/or create multiple customized reports for viewing different subsets of call center statistics. After creating a customized report, it may be saved as a template for future use so that the user is not required to repeat his or her custom call center data display preferences. The process of customizing a call center data report and saving the report may be repeated for each user.

One problem with conventional systems that display call center operating statistics is that customized reports require manual customization by each user. As a result, training costs associated with training users to customize reports may be burdensome for large organization. For example, two call center supervisors may each wish to view a customized report. Using conventional call center operating statistics display systems, each supervisor would be required to log in and customize his or her report, save the customized report, and then manually access the customized report after each login. The duplicated process of report customization for users sharing one or more characteristics unnecessarily wastes user and system resources. In addition, each user is required to remember the name of the saved customized report and to know how to access the customized report, resulting in further inefficiency.

Another problem associated with conventional call center data display systems is that users may improperly customize reports and/or have difficulty customizing reports. In conventional systems, a custom report may be created for displaying every type of call center data. Care must be taken to prevent low-level users from viewing certain types of call center data by selecting unauthorized call center operating statistics for display. Improper call center data may be accidentally displayed due to the complexity of call center data types and/or variable names. For example, in conventional call center systems, a user wishing to include a particular data type must select the variable name from a list corresponding to the data type. If the variable names are numerous and/or confusing, the user may incorrectly select the data to be displayed.

Another problem associated with conventional call center display systems is that as call center operating statistics data types change over time, each user must manually re-customize his or her reports. The cost associated with manual re-customization of reports to account for changes in data types may be especially burdensome for companies having large numbers of users. For example, some users may wish to view call wait time data associated with queues located in the east coast region. Initially, there may be four call queues associated with the east coast region and, therefore, each user may create a custom report for viewing call wait time data for these four queues. However, a fifth call queue may be added at a later time to the east coast region. In order for these users to also view call wait time data associated for the fifth queue, each user would be required to re-customize their reports by manually adding the variable associated with the fifth queue to the list of variables displayed in their reports. Several difficulties may be associated with this method including, but not limited to, users not knowing that the fifth queue variable has been added, not knowing the variable name associated with the fifth queue within the call center statistics database, or some users failing to re-customize their reports and becoming out of sync with other users.

Accordingly, in light of these difficulties, there is exists a need for methods, systems, and computer readable media for automatically displaying customized call center operating statistics based on user profile information.

SUMMARY

The subject matter described herein includes methods, systems, and computer readable media for automatically displaying customized call center operating statistics based on user profile information. According to one aspect, a method for automatically displaying customized call center operating statistics based on user profile information is provided. The method includes receiving user profile information associated with a user, wherein the user profile information uniquely identifies the user seeking access to customized call center operating statistics. Customized call center operating statistics to be displayed are automatically determined based on the user profile information. The customized call center operating statistics are then displayed to the user.

A system for automatically displaying customized call center operating statistics based on user profile information is also disclosed. The system includes a user profile database for storing user profile information and a call center statistics data source for storing call center operating statistics. An application server determines the user profile information and automatically determines the customized call center operating statistics to be displayed. The application server then displays the customized call center operating statistics to the user.

The subject matter described herein for automatically displaying customized call center operating statistics based on user profile information may be implemented using a computer readable medium having stored thereon program instructions that when executed by a processor of a computer perform steps. Exemplary computer readable media suitable for implementing the subject matter described herein include chip memory devices, disk memory devices, programmable logic devices, and application specific integrated circuits. In one example, a computer readable medium that implements the subject matter described herein may include a memory accessible by a processor. The memory may store a computer program containing instructions for automatically displaying customized call center operating statistics based on user profile information according to the methods and systems described herein. In addition, a computer readable medium that implements the subject matter described herein may be implemented on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
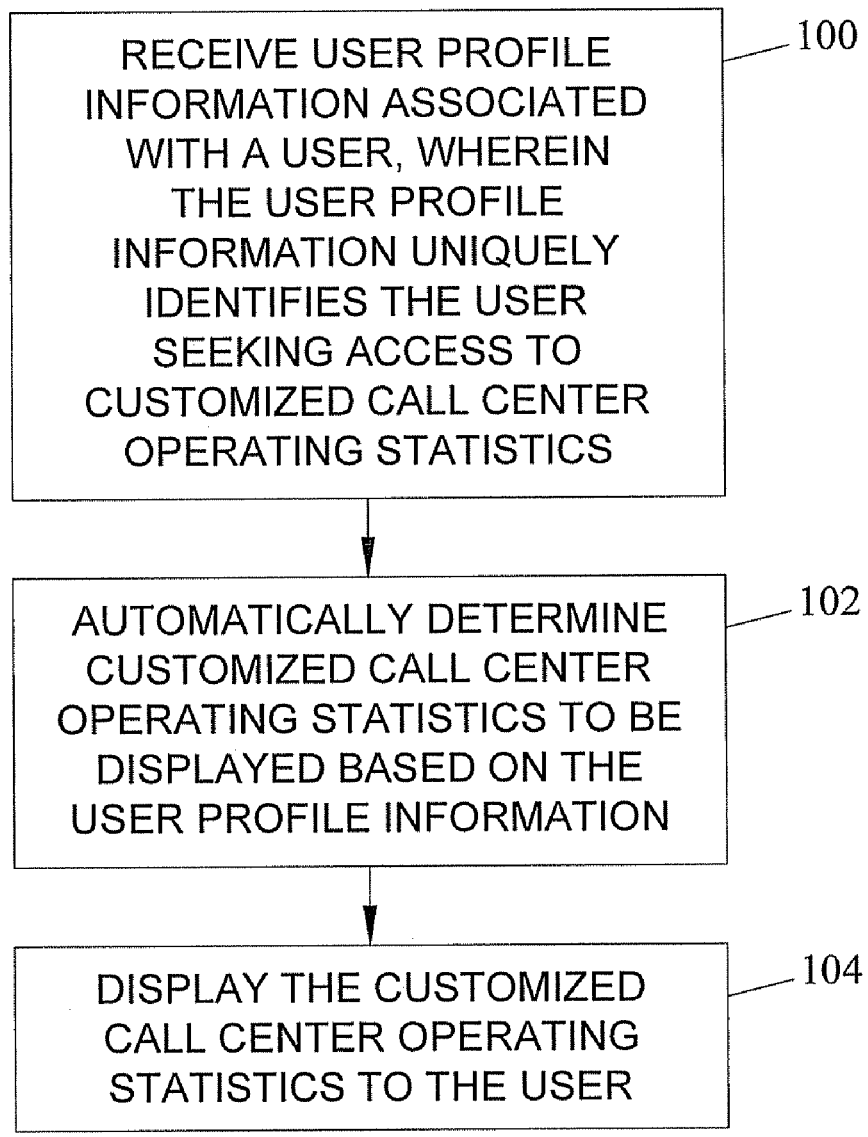
FIG. 1 is a flow chart illustrating an exemplary process for automatically displaying customized call center operating statistics based on user profile information according to an embodiment of the subject matter described herein.

The subject matter described herein includes methods, systems, and computer readable media for automatically displaying customized call center operating statistics based on user profile information.

As used herein, the term "call center operating statistics" or "call center data" refers to a quantifiable value or metric associated with the operation of a call center measured at a particular point in time. Call center operating statistics may include a string, a number, a date and time value, or an array of numbers, strings and/or date and time values. For example, a queue length may be the number "5", a listing of available agents statistic may include the string array "Bob, John", or the date and time value "Jan. 1, 2000 13:45" might indicate the time at which an agent became ready to take a call (which would then be converted to a numeric value in "seconds ago", or a string represented as "HH:MM:SS" indicating the hours, minutes, and seconds ago that the event occurred. While call center data is inherently associated with a time it is measured, it may also be identified by a call center data type. In turn, this call center data type may be identified by a call center data type variable name.

As used herein, the term "call center data type" refers to a common feature of one or more call center operating center statistics not being limited to a particular point in time. For example, at 10:00 am, the average call wait time may be 5 minutes and it may be 10 minutes when measured at 11:00 am. Thus, 5 minutes and 10 minutes are call center operating statistics measured at particular points in time (i.e., 10:00 am and 11:00 am, respectively). The average call wait time is the category of call center operating statistics that encompasses both pieces of data. Therefore, a second set of call center operating statistics containing identical data may be distinguished based on its call center data type. For example, if the queue length is 5 callers at 10:00 am and is 10 callers at 11:00 am, the queue length call center data would be the same as the average call wait time data above (i.e., 5 and 10). However, because queue length data and wait time data are the associated with different call center data types, the call center operating statistics may be distinguished.

As used herein, the term "call center data type variable name" refers to an identifier used to identify a call center data type within a call center operating statistics data source. Call center data type variable names may be changed based on database updates, adding or subtracting call center data types, or any other reason. Moreover, call center data type variable names may be difficult for a human user to read or remember because they are typically designed for use by a software program, such as a database program. Thus, it is appreciated that while call center data type variable names may change, the call center data types they refer to may not change, or may be changed independently of changes to their variable names.

As used herein, the term "custom variable name" refers to an identifier used to identify one or more call center data types for use by an application other than the call center operating statistics data source. Custom variable names may be associated with one or more call center data type variable names. Because custom variable names may be independent of call center data type variable names, custom variable names may be created so as to be easier for human administrators to understand and remember. Moreover, call center data type variable names may be changed without changing the custom variable names, or vice versa, by changing the associations between the variable names.

As used herein, the term "call center data object" or "object" refers to a structure for formatting the display of call center operating statistics. Examples of call center data objects include single data value objects, grid objects, pie chart objects, bar chart objects, image objects, and color objects. For example, call center operating statistics associated with the average call wait time and queue length for 6 different queues may be displayed as a grid containing, for example, 2 columns and 6 rows, where each column corresponds to a call center data type and each row corresponds to a queue. It is appreciated that other types of call center data objects may also be used to display call center operating statistics. For example, average call wait time may simply be represented by a color, where call wait times between 0-5 minutes may be represented by the color green, wait times between 5-10 minutes may be represented by orange, and wait times above 10 minutes may be represented by red.

As used herein, the term "call center data report" or "report" refers to a structure for formatting the display of call center operating statistics. A report may include one or more objects. Reports may be embodied in a variety of formats/delivery mechanisms. For example, a call center data report may include a webpage displayed to the user within a web browser. Alternatively, the report may include a display window of an application executed by the user on a PC. According to call center industry usage, a call center data report may also be referred to as a "dashboard".

As used herein, the term "user profile information" refers to information that uniquely identifies a user wishing to view call center operating statistics. Exemplary types of user profile information include a username and password associated with a session, a username and password associated with a system, a MAC address, an IP address, a computer name, a biometric identifier, and any other user or group preferences or restrictions.

FIG. 1 is a flow chart illustrating an exemplary process for automatically displaying customized call center operating statistics based on user profile information according to an embodiment of the subject matter described herein. Referring to FIG. 1, in step 100, user profile information associated with a user is received. The user profile information may uniquely identify the user from among other users seeking access to call center operating statistics. The user profile information may be used to display customized call center operating statistics for the user. The display of call center operating statistics may be customized, for example, either by including only a subset of the call center operating statistics and/or customizing the formatting of the display of the call center operating statistics.

In one embodiment, user profile information may be received when the user logs into application server and initiates a session for viewing call center operating statistics. For example, a user request to display call center operating statistics may be received when the user opens a web browser and the browser sends a hypertext transfer protocol (HTTP) GET statement to application server. As described above, user profile information may include, but is not limited to, a username and a password, a MAC address, an IP address, a computer name, a biometric identifier, and user or group preferences or restrictions. In this exemplary scenario, the user may launch a call center operating statistics display client program and enter a username and password combination for logging into a call center operating statistics display server program executed by an application server. The username and password combination may be used to uniquely identify the user. Other types of user profile information may also be directly provided by the user, such as a fingerprint, for identifying the user.

It may be appreciated that in addition to providing user profile information directly by the user, user profile information may also be gleaned automatically and without user intervention. For example, the user may provide a first username and password combination for logging onto the client terminal. This username and password may be managed by operating system software residing on the client terminal. Thereafter, an application server may interrogate the operating system in order to obtain this user profile information rather than maintaining separate username/password combinations for logging on to both the system and a call center operating statistics display session. One advantage of using user profile information already managed by the operating system is that operation, from the user's perspective, may be simplified. For example, it may be desirable for the operating system password to be different from the call center operating statistics display session password for security purposes. However, this may increase the burden on the user to remember multiple passwords. A disadvantage of using user profile information managed by the operating system is that if a client terminal is shared by multiple users, the shared login information may not uniquely identify a single user. However, this tradeoff may be acceptable in some situations where sharing of a terminal by multiple users is unlikely.

A second example of indirectly gleaning user profile information includes associating a media access control (MAC) for a network interface card (NIC) with a user. The call center operating statistics server program may interrogate the call center operating statistics client terminal for this MAC address. The MAC addresses for each NIC may be associated with a particular user, and therefore used in lieu of a directly entered user identifier, such as the first username and password described above.

In step 102, a determination of customized call center operating statistics to be displayed is made based on the user profile information.

Exemplary call center operating statistics may include agent data, team data, queue data, skill group data, and trunk group data. As defined above, the term "call center operating statistics" or "call center data" refers to a quantifiable value or metric associated with the operation of a call center measured at a particular point in time. Examples of call center operating statistics include strings, numbers, or arrays of strings and/or numbers. Thus, exemplary queue data may include an average queue size, a current queue size, a largest queue size, etc. For example, the user may selected a report from among several reports available based on his or her user profile information.

User profile information may also be associated with a view group for easier modification by an administrator. For example, a call center supervisor may wish to have one hundred call center employees view their personal daily and monthly call center operating statistics, yet be prevented from viewing call center operating statistics of other employees. Instead of creating custom reports for each employee, the supervisor may create a viewer group "employees" associated with the one hundred employees, where the call center operating statistics to be displayed in each customized report within the viewer group may be identified by a call center operating statistics variable name. Thus, at run time, an application server may substitute the variable names for call center operating statistics specific to each user. In this way, the supervisor may provide customized call center operating statistics reports to multiple users simply by customizing a single, centrally managed call center operating statistics report template.

In step 104, the call center operating statistics are automatically displayed to the user. For example, call center operating statistics may be formatted into one or more objects, where one or more objects may be displayed as part of a single report.

A report may be displayed to the user, for example, as a web page. Alternatively, the report may include a display window of an application executed by the user on a PC.

In one embodiment, a call center database may be queried to obtain call center operating statistics. The call center database may be any suitable database that stores call center operating statistics, such as the ICM databases described above.

One advantage of automatically displaying call center operating statistics based on user profile information is scalability. By centralizing the creation and administration of customized reports, a large number of users may be efficiently supported. In contrast, conventional systems requiring manual customization of call center reports typically become unmanageable for more than approximately one hundred users.

Another advantage is the reduced training and deployment costs associated with providing customized reports for multiple users. From the user's perspective, the process of viewing a customized call center operating statistics report may include simply providing a username and password and viewing the report. If a new user is added, an administrator may simply associate the new user profile information with call center statistics without requiring any input from the new user. There is no need to train new or existing users about how to create a customized report or which call center operating statistics variable names should or should not be used. Reduced training and deployment costs may result in large monetary savings for organizations having large numbers of users viewing call center operating statistics.

Another advantage is that custom reports may be protected from user error in creating custom reports. As described above, because conventional call center operating statistics display systems may allow all users access to all types of call center operating statistics, it may be difficult to prevent users from viewing restricted call center operating statistics. Moreover, because conventional call center operating statistics display systems may require that the user select obscure variable names defined by the call center operating statistics database that may change over time, users are likely to select incorrect and/or outdated call center operating statistics for display.

Another advantage is that, from the user's perspective, custom reports may be automatically and seamlessly updated to account for changes in data types, variable names, database structures, etc. which are of no interest to the user. For example, the viewer group "employees" is associated with a customized call center operating statistics report showing each employee's daily and monthly average call time. However, it may be desirable to add annual average call time data to the report. Rather than notifying all 100 employees to add the new variable name to their reports, a single administrator may update the report template for the employee's viewer group. Thus, when each user logs in and views his or her custom report, the additional call center operating statistics will automatically be displayed.

In another scenario illustrating an advantage of using viewer groups to seamlessly update custom reports, daily average call time statistics may be associated, within database Y, with variable name avg&CT#. For various reasons, this variable name may be changed to CT#avg&, yet still correspond to the same call center operating statistics (i.e., daily average call time). Rather than notifying all one hundred employees that the variable name has changed and what data it is associated with, a single administrator may update the report template for the employee's viewer group. Thus, when each user logs in and views his or her custom report, it will appear the same after the variable name change as it did before the variable name change.

Figure 2A:
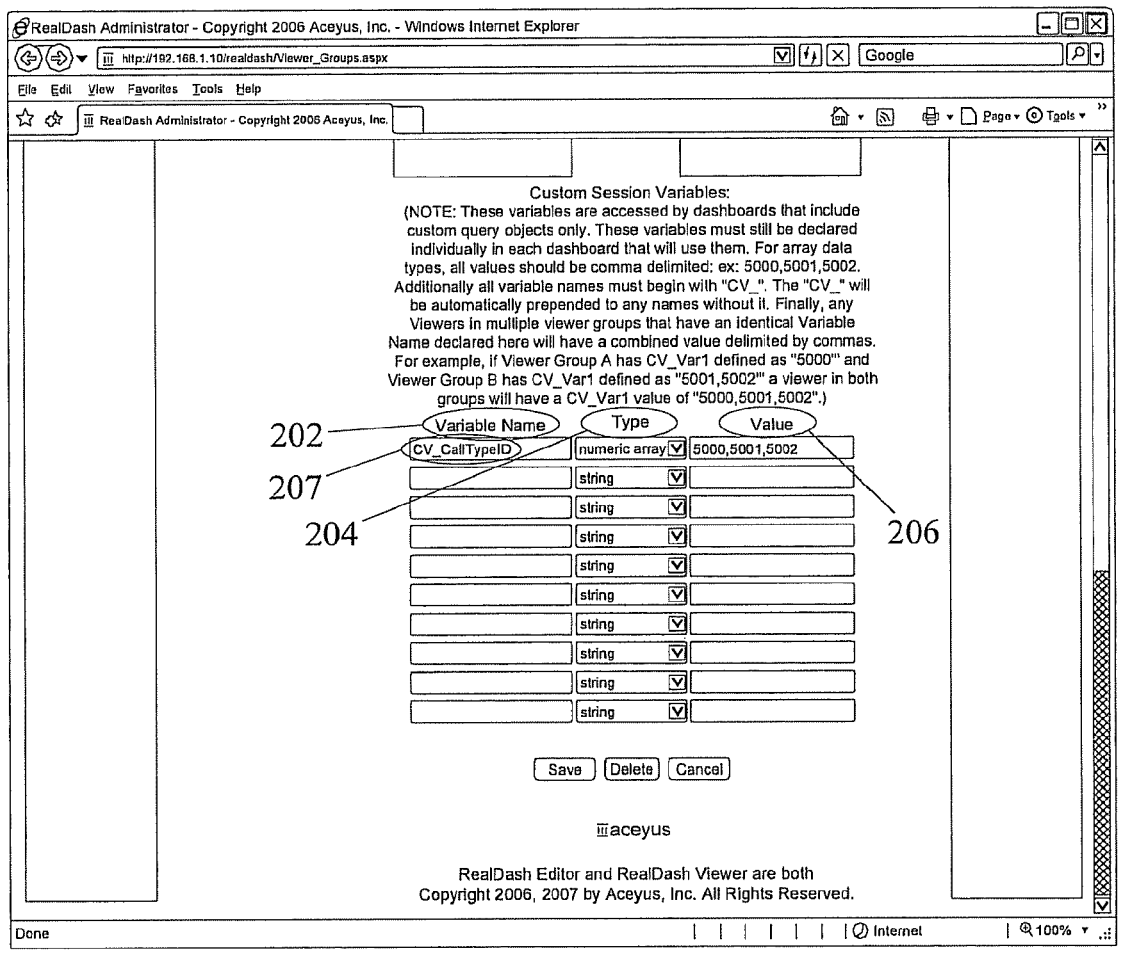
FIGS. 2A-2B are computer screen shots illustrating exemplary steps for associating call center operating statistic variables with custom variables for automatically displaying customized call center operating statistics based on user profile information according to an embodiment of the subject matter described herein.

FIG. 2A is a computer screen shot illustrating an exemplary web browser frame for inputting custom session variables for automatically displaying customized call center operating statistics based on user profile information according to an embodiment of the subject matter described herein. In the illustrated example, frame 200 displays a variable name 202 used to identify one or more call center data types for use by application server 402, a type 204 indicating whether a number, a string, or an array is associated with the variable name, and a value 206 indicating one or more call center data type variable names.

Figure 2B:
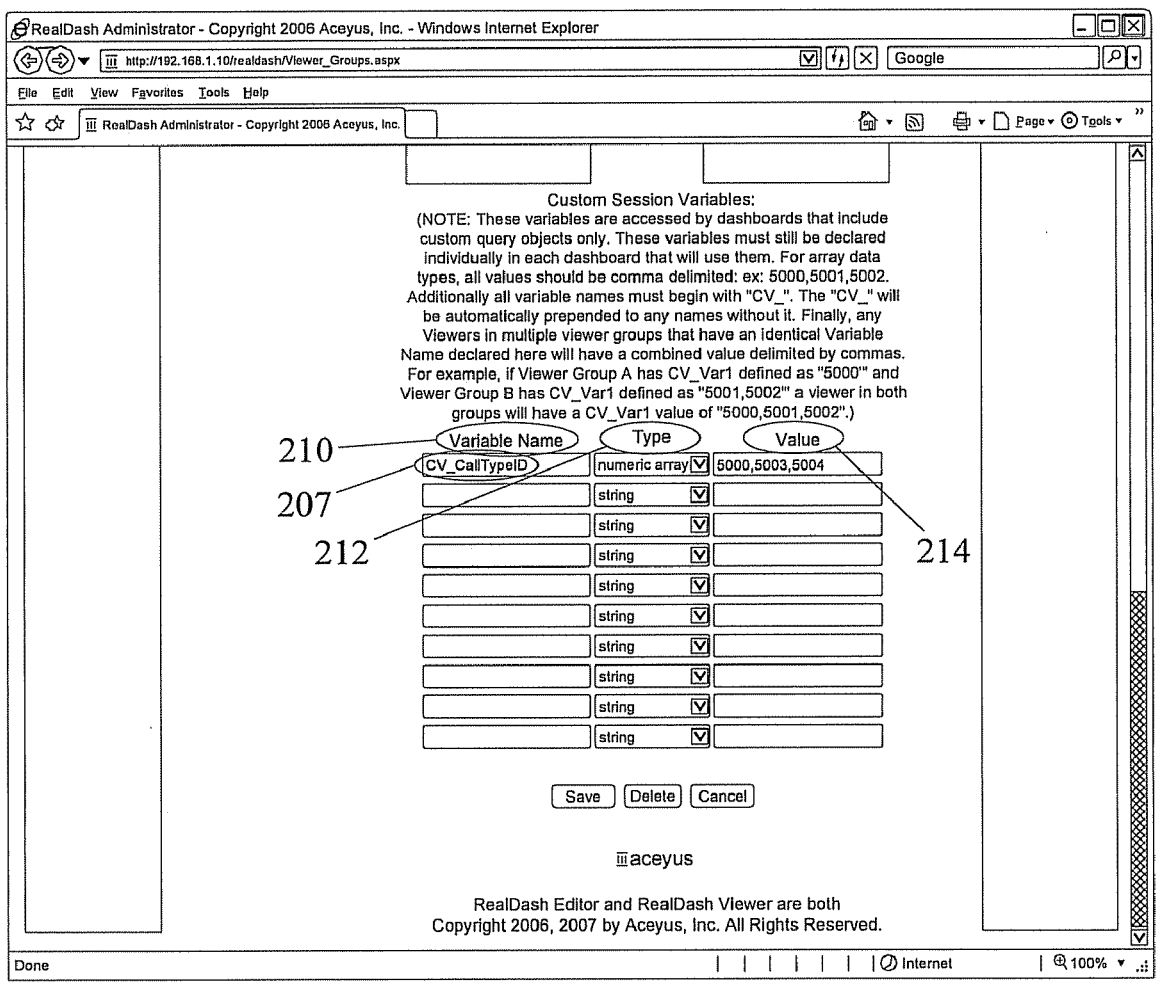

Referring to FIG. 2A, variable name 202 is associated with user ID 5000 and includes custom variable CV_CallTypeID 207 corresponding to a numeric array of three call center data type variable names 5000, 5001, and 5002. Similarly, in FIG. 2B, variable name 210 is associated with user ID 5001 and includes custom variable CV_CallTypeID 207 corresponding to a numeric array of three call center data type variable names 5000, 5003, and 5004. Thus, it is appreciated that different call center data type variables may be associated with custom variable names depending on the user.

Type 204 may include a variety of variable types including, but not limited to, a string, a number, and a date/time, or an array of strings, numbers, and dates/times.

Values 206 may be entered as a single value or as an array of values. Variables may be associated with partitioning a variety of call center data sources including, but not limited to, agent data, team data, queue data, skill group data, and trunk group data. Queue data may include VDN and call type data. Skill group data may include agent group and split data. It is appreciated that call center operating statistics identified by values 206 may include any suitable metric for measuring the operation of call center performance. Therefore, additional metrics which are not specifically disclosed but well known to those skilled in the art of call center operation may be used without departing from the scope of the subject matter described herein.

Users in the viewer group may establish a session variable called CV_CallTypeID with values of 5000, 5001, and 5002. If the user is in multiple viewer groups with a defined variable of CV_CallTypeID then the variable will combine their values. For example, if the second viewer group allowed access to CallTypeID values 5003, 5004, and 5005, the final value of CV_CallTypeID for the user would be 5000, 5001, 5002, 5003, 5004, and 5005. This would enable the user to view call center data associated with any of these call types.

Figure 3:
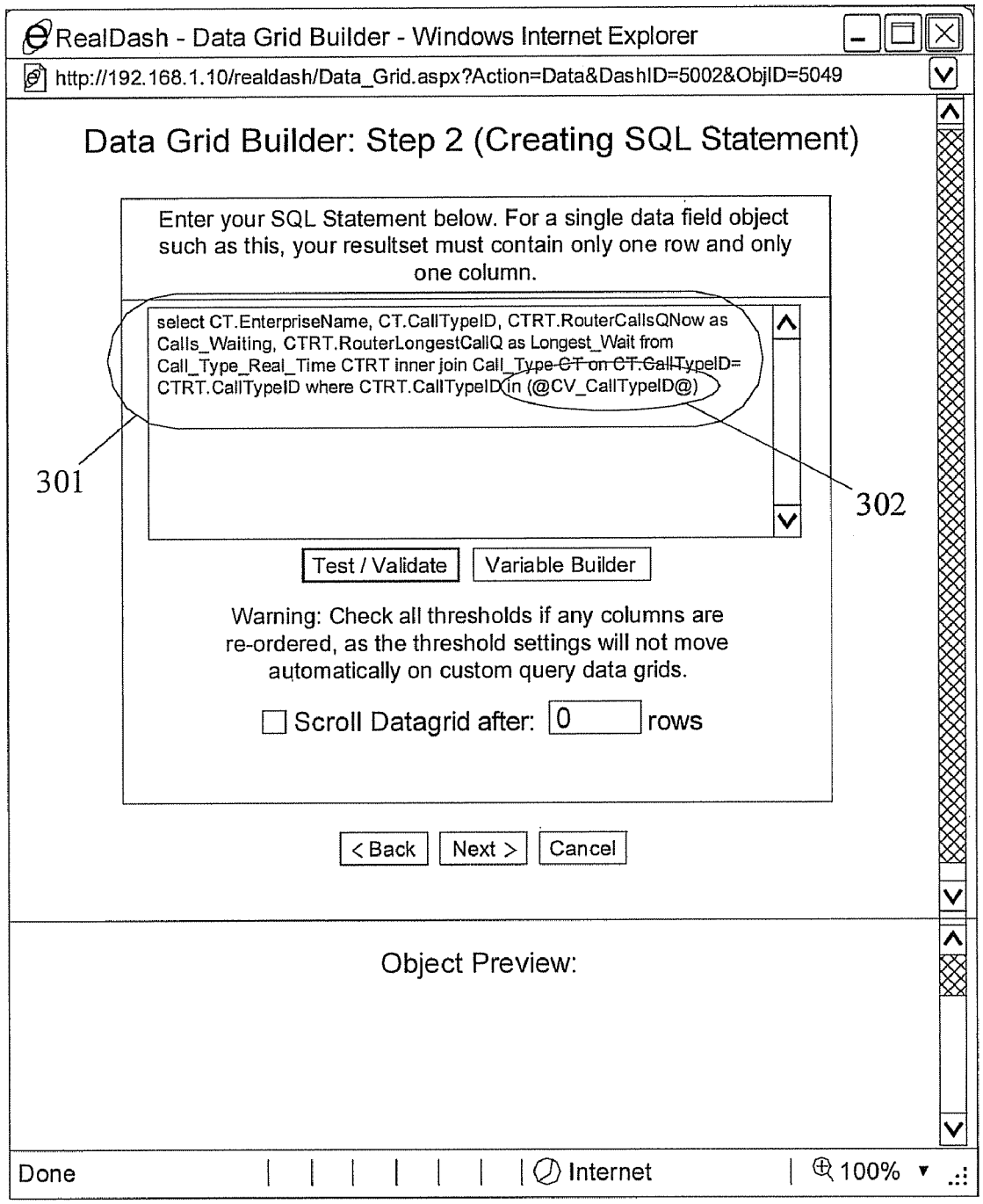
FIG. 3 is a computer screen shot illustrating the creation of a dynamic query including an embedded custom variable for automatically displaying customized call center operating statistics based on user profile information according to an embodiment of the subject matter described herein.

FIG. 3 is a computer screen shot illustrating the creation of a dynamic query for automatically displaying customized call center operating statistics based on user profile information according to an embodiment of the subject matter described herein. In the illustrated example, display frame 300 displays an entry screen for inputting an SQL query associated with users 5000 and 5001, as well as a test/validation component for showing a result of the query when compiled. In frame 300, when building a data object, variables may be included in SQL query 301 and may be surrounded by @ symbols indicating that the variable is a custom variable name rather than a call center data type variable name. Custom variables may be replaced with user-assigned session variable values based on their viewer group at run time. For example, at run-time, SQL query 301 may be compiled, during which custom variable CV_CallTypeID 302 may be replaced with call center data type variables 5000, 5001, and 5002 for user 5000, or replaced with call center data type variables 5000, 5003, and 5004 for user 5001.

Figure 4:
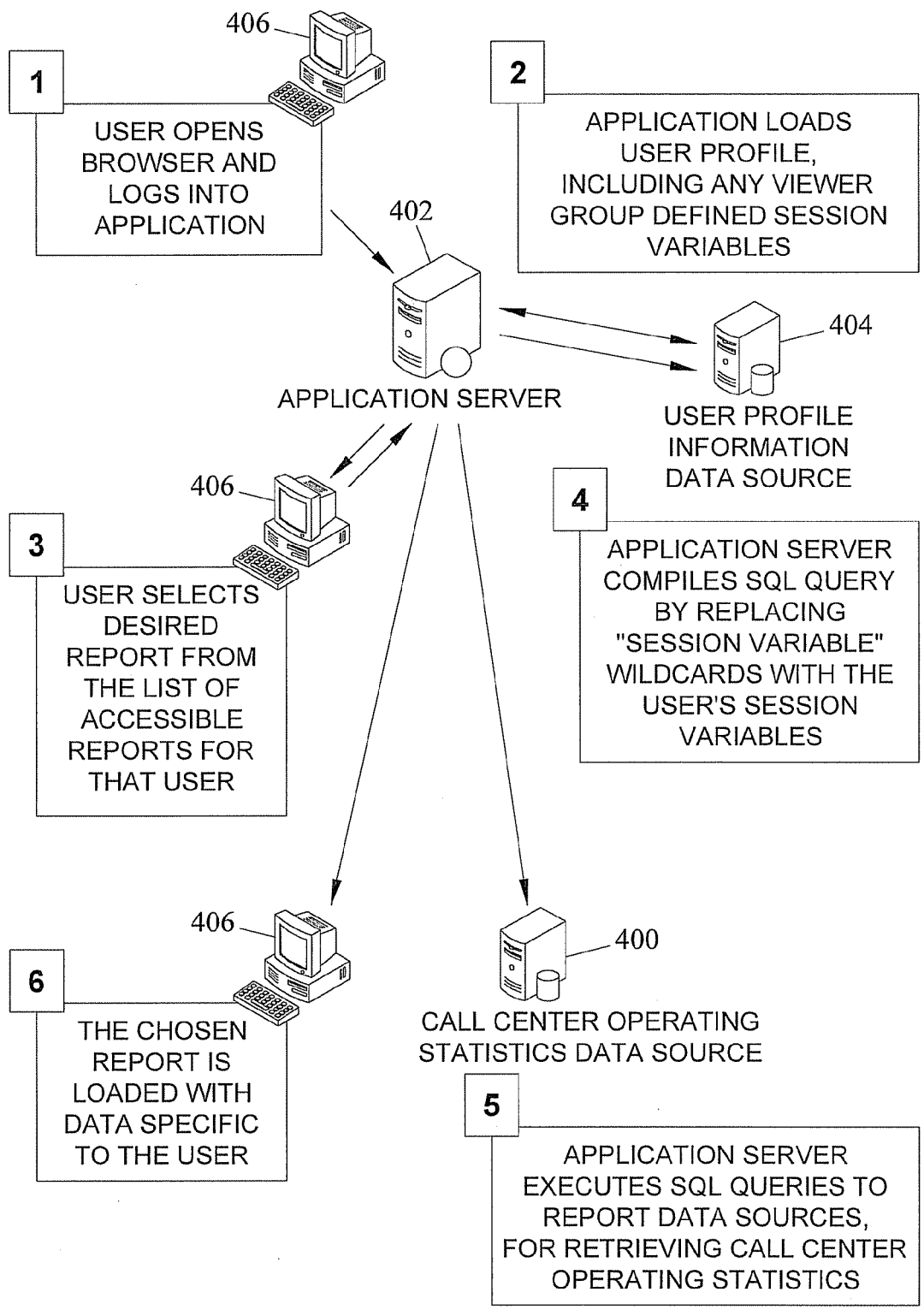
FIG. 4 is a network and operational flow diagram illustrating a method and a system for automatically displaying customized call center operating statistics based on user profile information according to an embodiment of the subject matter described herein.

FIG. 4 is a network and operational flow diagram illustrating a method and a system for automatically displaying customized call center operating statistics based on user profile information according to an embodiment of the subject matter described herein. Referring to FIG. 4, call center operating statistics may be maintained in call center operating statistics data source 400 accessible via a computer network. Call center operating statistics data source 400 may collect call center operating statistics based on the real time operational parameters of a call center. Examples of call center parameters or operating statistics that may be stored include call waiting time, number of agents staffed, number of calls in the queue, average call disposition time, average call waiting time, longest call waiting time, call type, etc. One example of a commercially available call center operating statistics database is the ICM or IPCC database available from Cisco Systems. In one implementation, call center operating statistics data source 400 may be a structured query language (SQL) database, a java database connectivity (JDBC), an open database connectivity (ODBC), a Microsoft Access database, or an Oracle database. However, any suitable relational database, an object-oriented database, or navigational database may be used without departing from the scope of the subject matter described herein. Call center operating statistics data source 400 may also include any data source configured to provide call center operating statistics via an application programming interface (API) and/or a real-time feed.

In order to display customized call center operating statistics based on user profile information, application server 402 may query user profile information database 404 containing user profile information. In one exemplary implementation, application server 402 may display customized call center operating statistics to a user via a web browser based on user profile information associated with the user. An exemplary process for automatically displaying customized call center data based on user profile information is described below.

Referring to the operational flow in FIG. 4, in step 1, a user may open a web browser via a user terminal 406 for viewing a web-based call center data report. For example, a web session request may be received when the user opens a browser and the browser sends an HTTP GET statement to web application server 402. By initiating a session with application server 402, the user may provide user profile information for identifying the user. For example, the user may provide user profile information such as a username/password combination associated with the session.

In step 2, application server 402 loads user profile information associated with the user. User profile information may include any information that uniquely identifies a user wishing to view call center operating statistics. Exemplary types of user profile information include a username and password associated with a session, a username and password associated with a system, a MAC address, an IP address, a computer name, and a biometric identifier, and any other user or group preferences or restrictions.

In one embodiment, user profile information may include a viewer group, such as "employees" or "east coast supervisors". If the user is a member of multiple viewer groups, the variables for the viewer groups may be combined.

According to one aspect, user profile information may be obtained via a username/password combination associated with the call center data display session. For example, the user may provide a username/password for logging into a call center display session executed by application server 402.

According to another aspect, user profile information may be obtained via a global username/password combination for the computer. For example, before initiating a web session with application server 402, the user may log into his or her computer using a global username/password managed by the operating system of computer 406. Once logged in to the computer, the user may then. This eliminates the need for an additional login in order to view call center statistics. For example, upon logging into his or her computer 406 via a global username/password, the operating system may pass this user profile information to application server 402 when the user launches a call center data display session. Exemplary operating systems that may manage global username/password combinations suitable for providing user profile information to the application server include, but are not limited to, Windows, Mac OS, and Linux.

One advantage to automatically gleaning user profile information without user intervention is that the burden of managing multiple logins may be eliminated for users. In one example, it may be assumed that a user who is able to log into his or her computer with a global username/password is the user associated with that login. Therefore, in some environments, a second user login may be avoided, thereby reducing the burden on the user. It is appreciated that a security risk associated with this method exists when multiple users share the same global login or a user's global login is stolen. However, this may be an acceptable tradeoff for some users.

Application server 402 may be any suitable application server including, but not limited to an Internet information services (IIS) web application server. In one embodiment, application server 402 may be a web application server running the .NET software platform available from Microsoft, Inc. of Redwood, Calif. It is appreciated that databases 400 and/or 404 may be located separately from application server 402 or may be co-located or integrated with application server 402 without departing from the scope of the subject matter described herein.

In step 3, the user may select a desired report (i.e. customized display of call center statistics) in the browser window from a list of reports accessible to the user. For example, a first user may have access to multiple call center operating statistics reports, such as reports corresponding to east coast, west coast, and national call center operations. However, a second user may only have access to one report for displaying his or her personal call statistics.

In step 4, application server 402 may generate a customized query including one or more variables for loading the report chosen in step 3. Referring back to the example query shown in FIG. 3, query 301 includes wildcard variable CV_CallTypeID, as indicated by being surrounded by @ symbols. It is appreciated that by compiling query 301 in step 3, the wildcard variable may be replaced with the user profile information loaded in step 2. Thus, for user 5000, upon compiling query 301, the query may include variable names 5000, 5001, and 5002 for locating call center operating statistics in call center information database 400.

In step 5, application server 402 queries call center operating statistics data source 400 using the customized query generated in step 4 for obtaining call center information customized for the report chosen in step 3. For example, call center operating statistics associated with variable 5000, 5001, and 5002 may be retrieved for display in a call center data report associated with user 5000.

In step 6, the chosen report is loaded into the user's browser for displaying call center data specific to the session variables for the user. For example, a report may be served by web application server 402 as a webpage containing one or more call center data objects for formatting the call center operating statistics customized for the user. Exemplary screen shots of call center operating statistics reports associated with users 5000 and 5001 are described in greater detail below with respect to FIGS. 5A-B and 6AB.

Figure 5A:
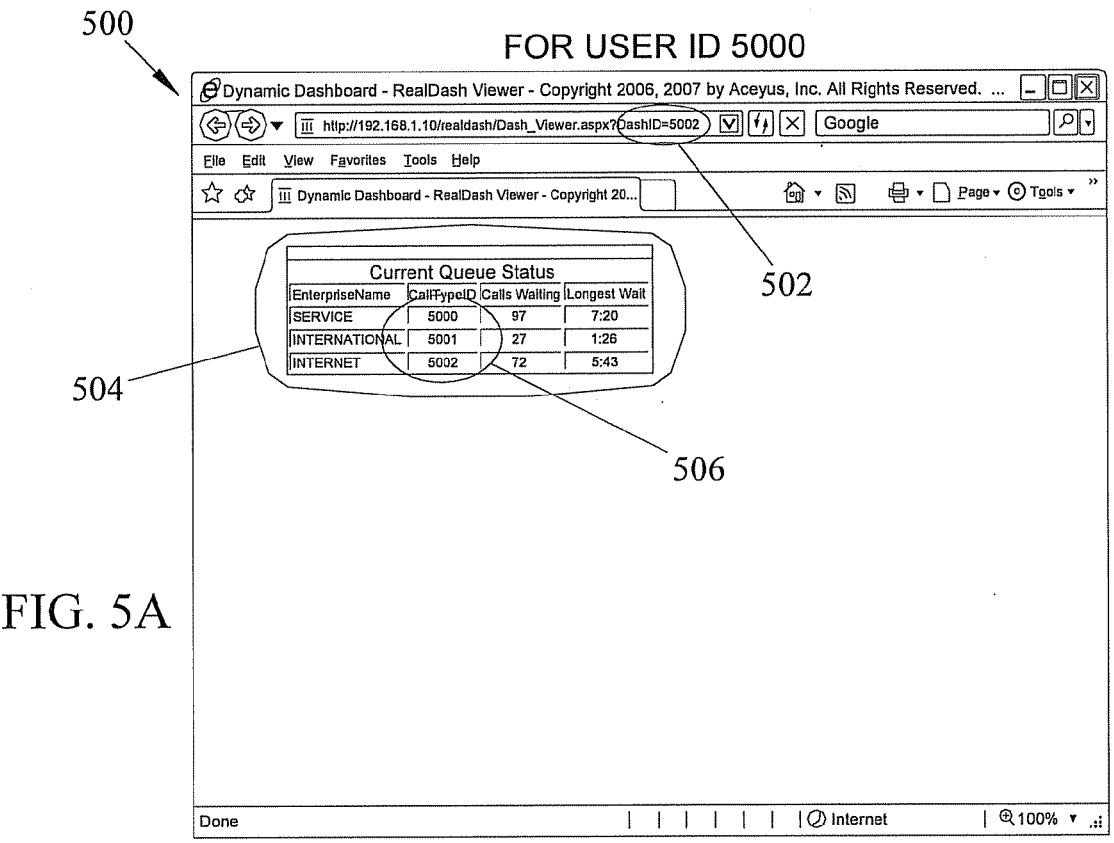
FIGS. 5A and 5B are computer screen shots of an exemplary web browser frame and debug window illustrating the loading of session variables for automatically displaying customized call center operating statistics based on user profile information according to an embodiment of the subject matter described herein.
Figure 5B:
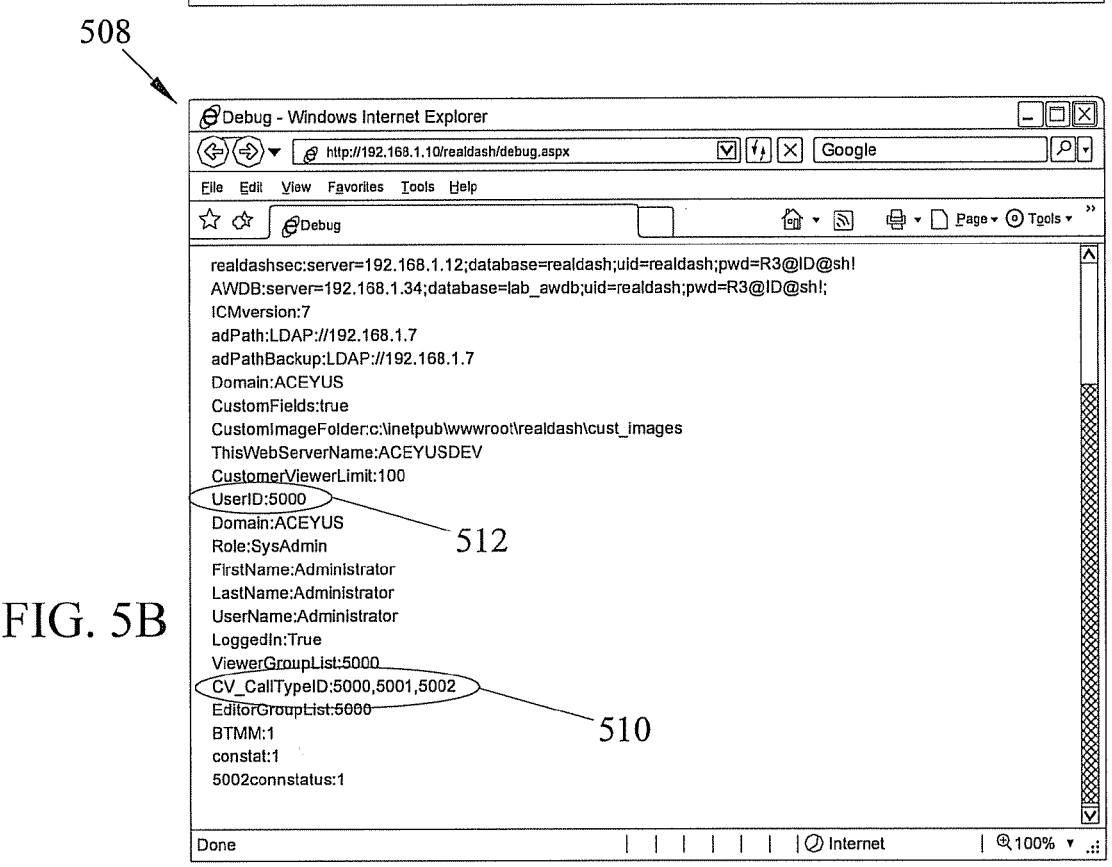

FIGS. 5A and 5B are computer screen shots of an exemplary web browser frame and a debug screen illustrating the loading of variables for automatically displaying customized call center operating statistics based on user profile information according to an embodiment of the subject matter described herein. FIG. 5A illustrates an exemplary report (Report ID 5002) run by a first user (User ID 5000). In the address bar of report 500, the report identifier 502 is shown as DashID=5002 indicating that the custom report associated with variable 5002 is displayed. Report 500 may display one or more objects, where each object contains one or more pieces of call center data. In the example shown, report 500 includes one object 504 comprising a data grid of current queue status for 3 enterprises: Service, International, and Internet. Current queue status call center data shown for each enterprise includes a call type ID, a number of calls waiting, and a longest call wait time.

Therefore, continuing the example described in FIGS. 2 and 3 where call type IDs 5000, 5001, and 5002 were associated with user ID 5000 and SQL query 301 was created including CV_CallTypeID variable 302, it is appreciated that display 500 shows that call type IDs 5000, 5001, and 5002 were properly displayed for user ID 5000.

As further proof that the associations of variables with user profile information illustrated in FIGS. 2 and 3 was correctly displayed in report 400, debug screen 5B is shown. Debugging is the methodical process of finding and reducing the number of defects in the code of a computer program in order to make the program perform as designed. A debugger is a computer program used to test computer programs by helping a programmer trace errors and unexpected behaviors in the execution of a computer program. Typically, execution of a program during debugging will be much slower than executing the code directly on the appropriate processor so that debugging techniques may be applied. For example, a debugger may halt the execution of the program when specific conditions are encountered in order to for the programmer to analyze the failure. Thus, a debug screen shows the steps performed by the computer when executing a program, in this case, when displaying report 500.

Referring to debug screen 508 shown in FIG. 5B, line 510 shows that the values associated with variable CV_CallTypeID to include 5000, 5001, and 5002, as expected. Furthermore, at line 512, UserID is associated with 5001 as expected.

Figure 6A:
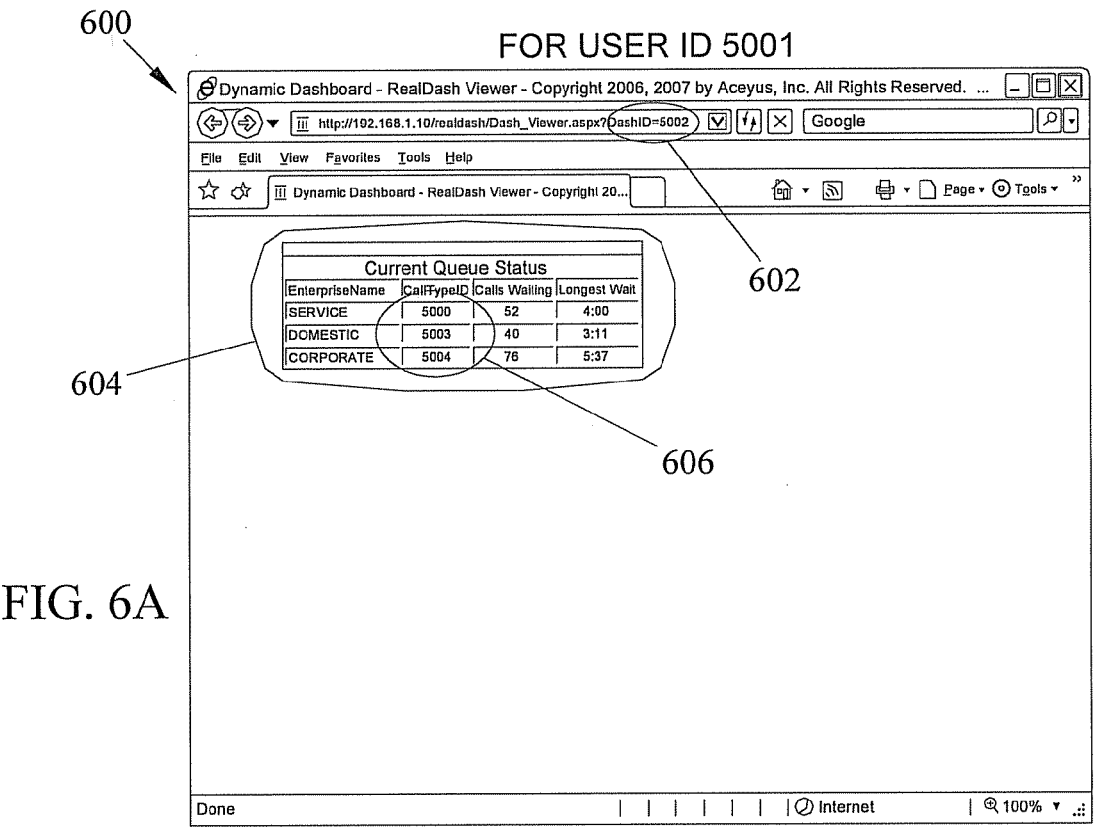
FIGS. 6A and 6B are computer screen shots of an exemplary web browser frame and debug window illustrating the loading of session variables for automatically displaying customized call center operating statistics based on user profile information according to an embodiment of the subject matter described herein.
Figure 6B:
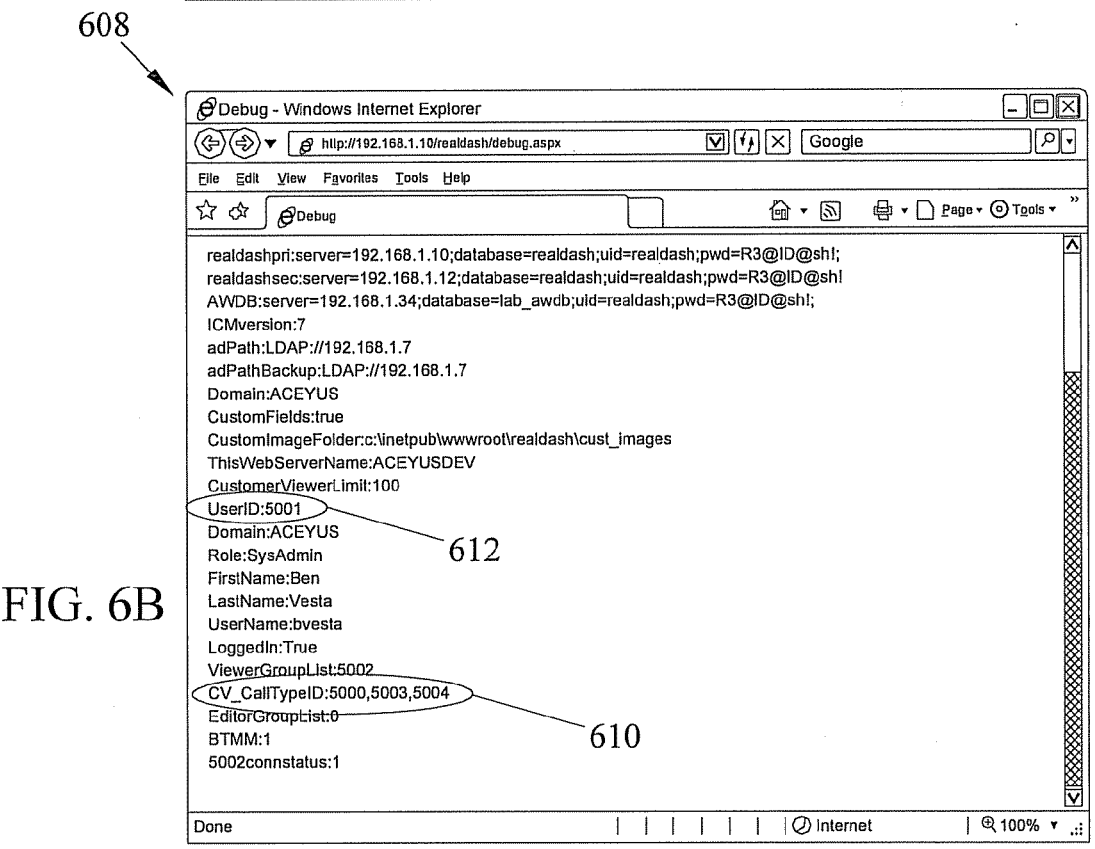

FIGS. 6A and 6B are computer screen shots of an exemplary web browser frame and debug window illustrating the loading of session variables for automatically displaying customized call center operating statistics based on user profile information according to an embodiment of the subject matter described herein. Continuing the example described above with respect to FIG. 2B where user 5001 was associated with variable name CV_CallTypeID, which was in turn associated with values 5000, 5001, and 5003. Therefore, when variable CV_CallTypeID 302 embedded in query 301 displayed in FIG. 3 is compiled, report 600 may be displayed to user 5001. In Report 600, a column of call center operating statistics corresponding to Call Type IDs displays values 500, 5003, and 5004, as expected.

Similarly, debug screen 608 shown in FIG. 6B illustrates at line 610 that CV_CallTypeID variable 207 is associated with values 5000, 5003, and 5004, as expected. Furthermore, at line 612, UserID is associated with 5001 as expected.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for automatically displaying customized call center operating statistics based on user profile information, the method comprising:
   receiving, at a user profile database, user profile information associated with a user, wherein the user profile information uniquely identifies the user seeking access to customized call center operating statistics;
   automatically determining customized call center operating statistics, by an application server, to be displayed based on the user profile information; and
   displaying, using a display window of an application executed by the user on a computer, the customized call center operating statistics to the user.

2. The method of claim 1 wherein receiving the user profile information includes receiving one of a username and password, a media access control (MAC) address, an Internet protocol (IP) address, a computer name, and a biometric identifier.

3. The method of claim 1 wherein receiving the user profile information includes one of receiving the user profile information entered directly by the user and gleaning the user profile information indirectly from a source other than the user.

4. The method of claim 1 wherein automatically determining the customized call center operating statistics includes receiving a selection of a customized call center data report from among a selection of a plurality of customized call center data reports associated with the user profile information.

5. The method of claim 1 wherein automatically determining the customized call center operating statistics includes determining one of an agent, a team, a queue, a skill group, and a trunk group associated with the user profile information.

6. The method of claim 1 wherein determining the customized call center operating statistics includes determining a viewer group associated with the user profile information.

7. The method of claim 1 wherein automatically determining the customized call center operating statistics includes querying a database containing the call center operating statistics based on the user profile information.

8. The method of claim 7 wherein querying the database includes compiling and executing a structured query language (SQL) query.

9. The method of claim 1 wherein the display of call center operating statistics is customized by selecting a subset of the call center operating statistics to be displayed and/or customizing the formatting of the call center operating statistics displayed.

10. The method of claim 1 wherein the display of call center operating statistics is customized by customizing the formatting of the call center operating statistics displayed.

11. The method of claim 1 wherein automatically displaying the call center operating statistics includes displaying a report including one or more objects, where the call center operating statistics are formatted by plugging them into the objects.

12. The method of claim 11 wherein automatically displaying the report includes displaying at least one of a single data value object, grid object, a bar chart object, a pie chart object, an image object, and a color object.

13. A system for automatically displaying customized call center operating statistics based on user profile information, the system comprising:
 a user profile database for storing user profile information associated with a user that uniquely identifies the user;
 a call center statistics data source for storing call center operating statistics; and
 an application server for automatically determining the customized call center operating statistics based on the user profile information, receiving user profile information associated with a user seeking access to customized call center operating statistics, and
 displaying the customized call center operating statistics to the user.

14. The system of claim 13 wherein the application server is configured to receive one of a username and password, a media access control (MAC) address, an Internet protocol (IP) address, a computer name, and a biometric identifier.

15. The system of claim 13 wherein the application server is configured to receive one of user profile information entered directly by the user and user profile information indirectly gleaned from a source other than the user.

16. The system of claim 13 wherein the application server is configured to receive a selection of a customized call center data report from among a selection of a plurality of customized call center data reports associated with the user profile information.

17. The system of claim 13 wherein the application server is configured to automatically determine one of an agent, a team, a queue, a skill group, and a trunk group, or similar call center metric associated with the user profile information.

18. The system of claim 13 wherein the application server is configured to determine a viewer group associated with the user profile information.

19. The system of claim 13 wherein the call center operating statistics data source is one of a database storing call center operating statistics and a data source configured to provide call center operating statistics via an application programming interface (API) and/or real-time feed.

20. The system of claim 19 wherein the query includes one of a relational database query, an object-oriented database query, and a navigational database query.

21. The system of claim 19 wherein the query includes one of a structured query language (SQL) query, a java database connectivity (JDBC) query, an open database connectivity (ODBC) query, a Microsoft Access database query, and an Oracle database query.

22. The system of claim 13 wherein the application server is configured to display a report including one or more objects, wherein the call center operating statistics are formatted by plugging them into the objects.

23. The system of claim 22 wherein the report includes at least one of a single data value object, a grid object, a bar chart object, a pie chart object, an image object, and a color object.

24. A non-transitory computer readable medium having stored thereon computer executable instructions that when executed by the processor of a computer perform steps comprising:
 receiving user profile information associated with a user, wherein the user profile information uniquely identifies the user seeking access to customized call center operating statistics;
 automatically determining customized call center operating statistics to be displayed based on the user profile information; and
 displaying the customized call center operating statistics to the user.

* * * * *